(12) United States Patent
Boyd et al.

(10) Patent No.: US 8,588,257 B2
(45) Date of Patent: Nov. 19, 2013

(54) METHOD AND APPARATUS FOR ACCOMMODATING DIFFERRENT CLOCK FREQUENCIES IN AN ETHERNET PASSIVE OPTICAL NETWORK

(75) Inventors: Edward W. Boyd, Petaluma, CA (US); Ryan E. Hirth, Windsor, CA (US); Hung Nguyen, Rohnert Park, CA (US)

(73) Assignee: Broadcom Corporation, Irvine, CA (US)

( * ) Notice: Subject to any disclaimer, the term of this patent is extended or adjusted under 35 U.S.C. 154(b) by 115 days.

(21) Appl. No.: 13/073,525

(22) Filed: Mar. 28, 2011

(65) Prior Publication Data

US 2011/0170868 A1    Jul. 14, 2011

Related U.S. Application Data (63) Continuation of application No. 11/478,492, filed on Jun. 28, 2006, now Pat. No. 7,929,576.

(60) Provisional application No. 60/695,795, filed on Jun. 29, 2005.

(51) Int. Cl.
*H04J 3/06*        (2006.01)

(52) U.S. Cl.
CPC .................................... *H04J 3/0638* (2013.01)
USPC .............................. 370/505; 398/98; 398/161

(58) Field of Classification Search
CPC ....... H04J 3/1694; H04J 14/08; H04J 3/0638; H04J 3/0682
USPC ..................... 398/98, 161; 370/442, 505–506
See application file for complete search history.

(56) References Cited

U.S. PATENT DOCUMENTS

| | | |
|---|---|---|
| 5,146,477 A | 9/1992 | Cantoni et al. |
| 6,470,032 B2 | 10/2002 | Dudziak et al. |
| 7,031,343 B1 | 4/2006 | Kuo et al. |

(Continued)

FOREIGN PATENT DOCUMENTS

EP        0 952 753 A2    10/1999

OTHER PUBLICATIONS

International Search Report directed toward related International Application No. PCT/US2006/025263, mailed Feb. 2, 2007 from the ISA/US, Alexandria, Virginia, U.S.A,; 1 page.

(Continued)

*Primary Examiner* — Kibrom T Hailu
*Assistant Examiner* — Benjamin Lamont
(74) *Attorney, Agent, or Firm* — Sterne, Kessler, Goldstein & Fox P.L.L.C.

(57) ABSTRACT

One embodiment of the present invention provides a system that accommodates different clock frequencies in an Ethernet passive optical network (EPON). The system receives a signal from an optical line terminal (OLT) at an optical network unit (ONU) and derives an OLT clock. The system also maintains a local clock. The system further receives from the OLT an assignment for an upstream transmission window, during which the ONU can transmit an upstream data burst to the OLT based on the local clock. The system adjusts the number of bits of the data burst without affecting the payload data carried in the data burst, thereby allowing the data burst to fit properly within the upstream transmission window and compensating for frequency differences between the local clock and the OLT clock. The system transmits the data burst based on the local clock in the upstream transmission window.

20 Claims, 4 Drawing Sheets

(56) References Cited

U.S. PATENT DOCUMENTS

| | | |
|---|---|---|
| 7,593,327 B2 * | 9/2009 | Bordogna et al. ............ 370/230 |
| 7,929,576 B2 | 4/2011 | Boyd et al. |
| 8,208,815 B1 * | 6/2012 | Chiang et al. ................. 398/155 |
| 2002/0136232 A1 | 9/2002 | Dudziak et al. |
| 2003/0048801 A1 * | 3/2003 | Sala et al. ..................... 370/445 |
| 2003/0137975 A1 | 7/2003 | Song et al. |
| 2003/0179769 A1 | 9/2003 | Shi et al. |
| 2009/0162065 A1 * | 6/2009 | Mizutani et al. ................ 398/66 |

OTHER PUBLICATIONS

International Preliminary Report on Patentability with Written Opinion directed toward related International Application No. PCT/US2006/025263, mailed Jan. 9, 2008 from the International Bureau of WIPO, Geneva, Switzerland; 5 page.

* cited by examiner

METHOD AND APPARATUS FOR ACCOMMODATING DIFFERRENT CLOCK FREQUENCIES IN AN ETHERNET PASSIVE OPTICAL NETWORK

CROSS-REFERENCE TO RELATED APPLICATIONS

The present application is a continuation of U.S. patent application Ser. No. 11/478,492, filed on Jun. 28, 2006, now U.S. Pat. No. 7,929,576, which claims the benefit of U.S. Provisional Patent Appl. No. 60/695,795 filed on Jun. 29, 2005. U.S. patent application Ser. No. 11/478,492 is incorporated herein by reference in its entirety.

BACKGROUND

1. Field of Invention

The present invention relates to the design of Ethernet passive optical networks. More specifically, the present invention relates to a method and a system that accommodates different clock frequencies between an optical line terminal and an optical network unit in an Ethernet passive optical network.

2. Related Art

In order to keep pace with increasing Internet traffic, optical fibers and associated optical transmission equipment have been widely deployed to substantially increase the capacity of backbone networks. However, this increase in the capacity of backbone networks has not been matched by a corresponding increase in the capacity of access networks. Even with broadband solutions, such as digital subscriber line (DSL) and cable modem (CM), the limited bandwidth offered by current access networks creates a severe bottleneck in delivering high bandwidth to end users.

Among the different technologies that are presently being developed, Ethernet passive optical networks (EPONs) are one of the best candidates for next-generation access networks. EPONs combine ubiquitous Ethernet technology with inexpensive passive optics. Hence, they offer the simplicity and scalability of Ethernet with the cost-efficiency and high capacity of passive optics. In particular, due to the high bandwidth of optical fibers, EPONs are capable of accommodating broadband voice, data, and video traffic simultaneously. Such integrated service is difficult to provide with DSL or CM technology. Furthermore, EPONs are more suitable for Internet Protocol (IP) traffic, because Ethernet frames can directly encapsulate native IP packets with different sizes, whereas ATM passive optical networks (APONs) use fixed-size ATM cells and consequently require packet fragmentation and reassembly.

Typically, EPONs are used in the "first mile" of the network, which provides connectivity between the service provider's central offices and business or residential subscribers. Logically, the first mile is a point-to-multipoint network, with a central office servicing a number of subscribers. A tree topology can be used it an EPON, wherein one fiber couples the central office to a passive optical splitter, which divides and distributes downstream optical signals to subscribers and combines upstream optical signals from subscribers (see FIG. 1).

Figure 2:
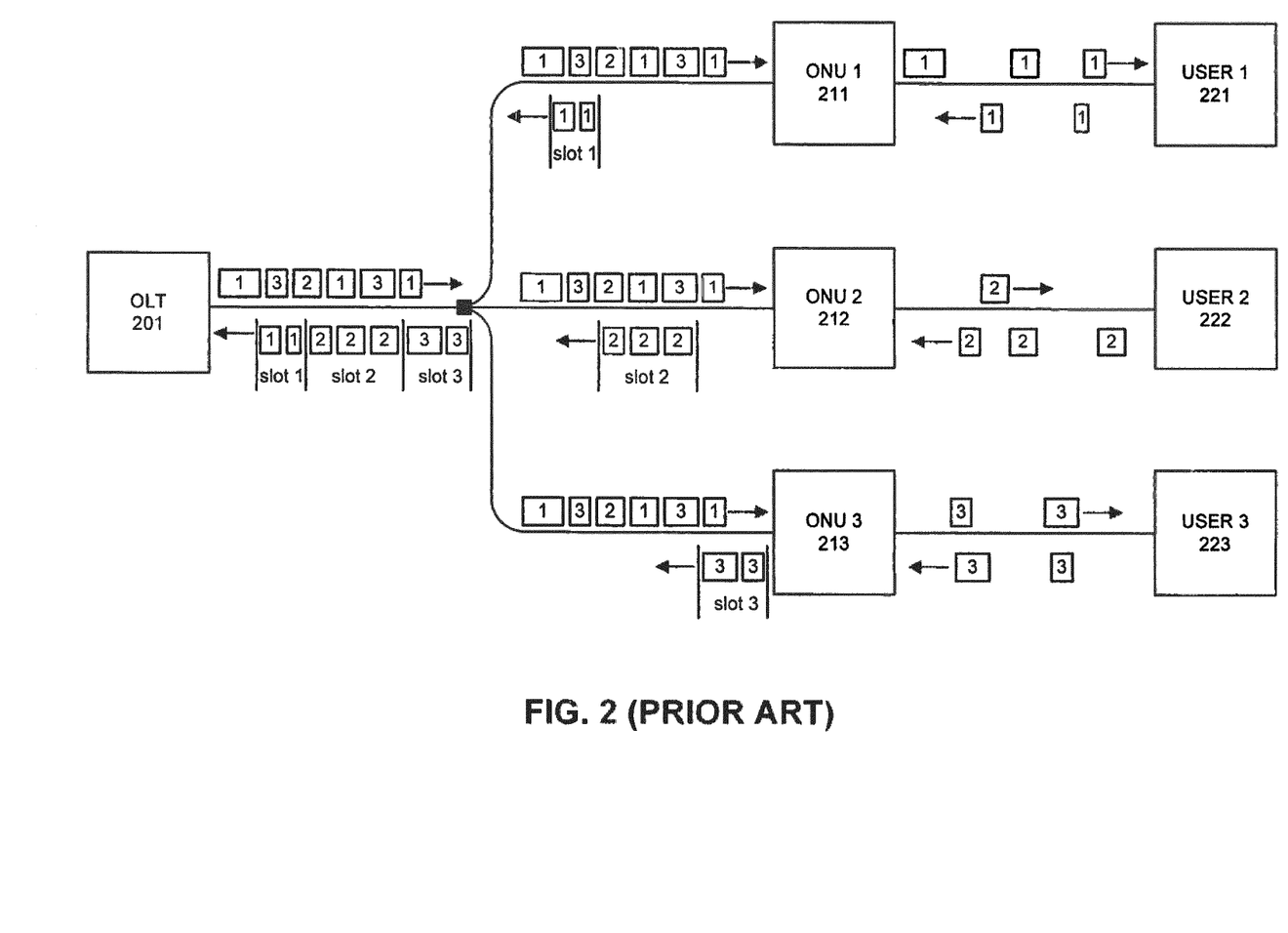
FIG. 2 illustrates an EPON in normal operation mode (prior art).

Transmissions within an EPON are typically performed between an optical line terminal (OLT) and optical networks units (ONUs) (see FIG. 2). The OLT generally resides in the central office and couples the optical access network to a metro backbone, which is typically an external network belonging to an Internet Service Provider (ISP) or a local exchange carrier. An ONU can be located either at the curb or at an end-user location, and can provide broadband voice, data, and video services. ONUs are typically coupled to a one-by-N (1×N) passive optical coupler, where N is the number of ONUs, and the passive optical coupler is typically coupled to the OLT through a single optical link. (Note that one may use a number of cascaded optical splitters/couplers.) This configuration can significantly save the number of fibers and amount of hardware required by EPONs.

Communications within an EPON can be divided into downstream traffic (from OLT to ONUs) and upstream traffic (from ONUs to OLT). In the downstream direction, because of the broadcast nature of the 1×N passive optical coupler, downstream data frames are broadcast by the OLT to all ONUs and are selectively extracted by their destination ONUs. In the upstream direction, the ONUs need to share channel capacity and resources, because there is only one link coupling the passive optical coupler with the OLT.

One challenge in designing an EPON is to mitigate the effect of different clock frequencies used for transmission at the ONUs. When an ONU's transmission clock frequency drifts away from the OLT clock, the actual time consumed by an upstream burst from that ONU may be longer or shorter than the size of the assigned transmission window. This may lead to erroneous reception of the upstream bits and potentially cause overlapping between two consecutive upstream bursts from different ONUs.

Hence, what is needed is a method and a system for accommodating different clock frequencies within an EPON so that an upstream data burst remains within its assigned transmission window.

SUMMARY OF THE INVENTION

One embodiment of the present invention provides a system that accommodates different clock frequencies in an Ethernet passive optical network (EPON), wherein the EPON includes an optical line terminal (OLT) and one or more optical network units (ONU's). During operation, the system receives a signal from the OLT at the ONU and derives an OLT clock from the received signal. The system also maintains a local clock. The system further receives from the OLT an assignment for an upstream transmission window, during which the ONU can transmit an upstream data burst to the OLT based on the local clock. The system adjusts the number of bits of the data burst without affecting the payload data carried in the data burst, thereby allowing the data burst to fit properly within the upstream transmission window and compensating for frequency differences between the local clock and the OLT clock. The system then transmits the data burst based on the local clock in the upstream transmission window.

In a variation on this embodiment, adjusting the number of bits of the data burst involves inserting one or more unused bits into the data burst without affecting the payload data when the transmission time of the data burst based on the local clock is shorter than the transmission time based on the OLT clock by a pre-determined threshold.

In a further variation, the predetermined threshold corresponds to the transmission time of a character based on the local clock or the OLT clock. Furthermore, inserting one or more unused bits into the data burst involves inserting an idle character into an inter-packet gap between two packets contained in the data burst.

In a variation on this embodiment, adjusting the number of bits of the data burst involves removing one or more unused bits from the data burst without affecting the payload data when the transmission time of the data burst based on the local clock is longer than the transmission time based on the OLT clock by a pre-determined threshold.

In a further variation, the pre-determined threshold corresponds to the transmission time of a character based on the local clock or the OLT clock. Furthermore, removing one or more unused bits from the data burst involves removing an idle character from an inter-packet gap between two packets contained in the data burst.

A further embodiment of the present invention provides a system that accommodates different clock frequencies in an EPON, wherein the EPON includes an OLT and one or more ONU's. During operation, the system receives a signal from the OLT at the ONU and derives an OLT clock from the received signal. The system also maintains a local clock. The system further compares the local clock with the OLT clock. The system requests from the OLT an upstream transmission window based on the comparison, wherein the upstream transmission window can accommodate an upstream data burst transmitted based on the local clock.

In a variation on this embodiment, the system determines the duration of the upstream transmission window based on the size of the data burst and the local clock. The system further determines the size of the upstream transmission window in terms of amount of data that can be transmitted based on the OLT clock during the determined duration. Furthermore, requesting the upstream transmission window involves communicating to the OLT the determined size of the upstream transmission window in terms of amount of data to be transmitted based on the OLT clock.

A further embodiment of the present invention provides a system for accommodating different clock frequencies in an EPON, the EPON including an OLT and one or more ONU's. The system includes an OLT-clock derivation module configured: (i) to receive a signal, (ii) to derive an OLT clock from the signal, and (iii) to maintain a local clock to simulate an OLT clock. The system additionally includes a receiving module configured to receive an assignment for an upstream transmission window for transmission of an upstream data burst based on the local clock. The system further includes a determination module configured to determine a size of the upstream transmission window in terms of an amount of data that is to be transmitted based on the OLT clock. The system yet further includes an adjustment module configured to adjust a number of bits of the upstream data burst without affecting a payload data carried in the upstream data burst by inserting or removing unused bits in corresponding inter-packet gaps between packets contained in the upstream data burst, thereby allowing the upstream data burst to fit properly within the upstream transmission window and compensating for frequency differences between the local clock and the OLT clock. The system yet further includes a transmission module configured to transmit the upstream data burst based on the local clock during the upstream transmission window. In this further embodiment, a number of bits inserted or removed is determined by the difference between the size of the upstream transmission window and a size of upstream data burst.

In a variation on this embodiment, the adjustment module includes an insertion module configured to insert one or more unused bits into the upstream data burst without affecting the payload data when a transmission time of the upstream data burst based on the local clock is shorter than a transmission time based on the OLT clock by a pre-determined threshold.

In an additional variation on this embodiment, the pre-determined threshold corresponds to a transmission time of a character based on the local clock or the OLT clock. In this additional variation, the insertion module is configured to insert an idle character into the corresponding inter-packet gaps between the packets contained in the upstream data burst.

In a further variation on this embodiment, the adjustment module includes a removal module configured to remove one or more unused bits from the upstream data burst without affecting the payload data when a transmission time of the upstream data burst based on the local clock is longer than a transmission time based on the OLT clock by a pre-determined threshold.

In a yet further variation on this embodiment, the pre-determined threshold corresponds to a transmission time of a character based on the local clock or the OLT clock. In this yet further variation, the removal module is configured to remove an idle character into the corresponding inter-packet gaps between the packets contained in the upstream data burst.

A further embodiment of the present invention provides a system for accommodating different clock frequencies in an EPON, the EPON including an OLT and one or more ONU's. The system includes an OLT-clock derivation module configured (i) to receive a signal, (ii) to derive an OLT clock from the signal, and (iii) to maintain a local clock to simulate an OLT clock. The system additionally includes a comparison module configured to compare the local clock and the OLT clock. The system further includes a request module configured to request an upstream transmission window based on the comparison. In this further embodiment, the upstream transmission window is configured to accommodate an upstream data burst transmitted based on the local clock.

In a variation on this embodiment, the system further includes a determination module configured to: (i) determine a duration of the upstream transmission window based on a size of the upstream data burst and the local clock, and (ii) to determine a size of the upstream transmission window in terms of an amount of data that is to be transmitted based on the OLT clock during the duration of the upstream transmission window. In this variation, the requesting module is configured to communicate the size of the upstream transmission window in terms of the amount of data that is to be transmitted based on the OLT clock.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention (e.g., general passive optical network (PON) architectures). Thus, the present invention is not intended to be limited to the embodiments shown, but is to be accorded the widest scope consistent with the principles and features disclosed herein.

The data structures and procedures described in this detailed description are typically stored on a computer readable storage medium, which may be any device or medium that can store code and/or data for use by a computer system. This includes, but is not limited to, application specific integrated circuits (ASICs), field-programmable gate arrays (FPGAs), semiconductor memories, magnetic and optical storage devices such as disk drives, magnetic tape, CDs (compact discs), and DVDs (digital versatile discs or digital video discs).

Passive Optical Network Topology

Figure 1:
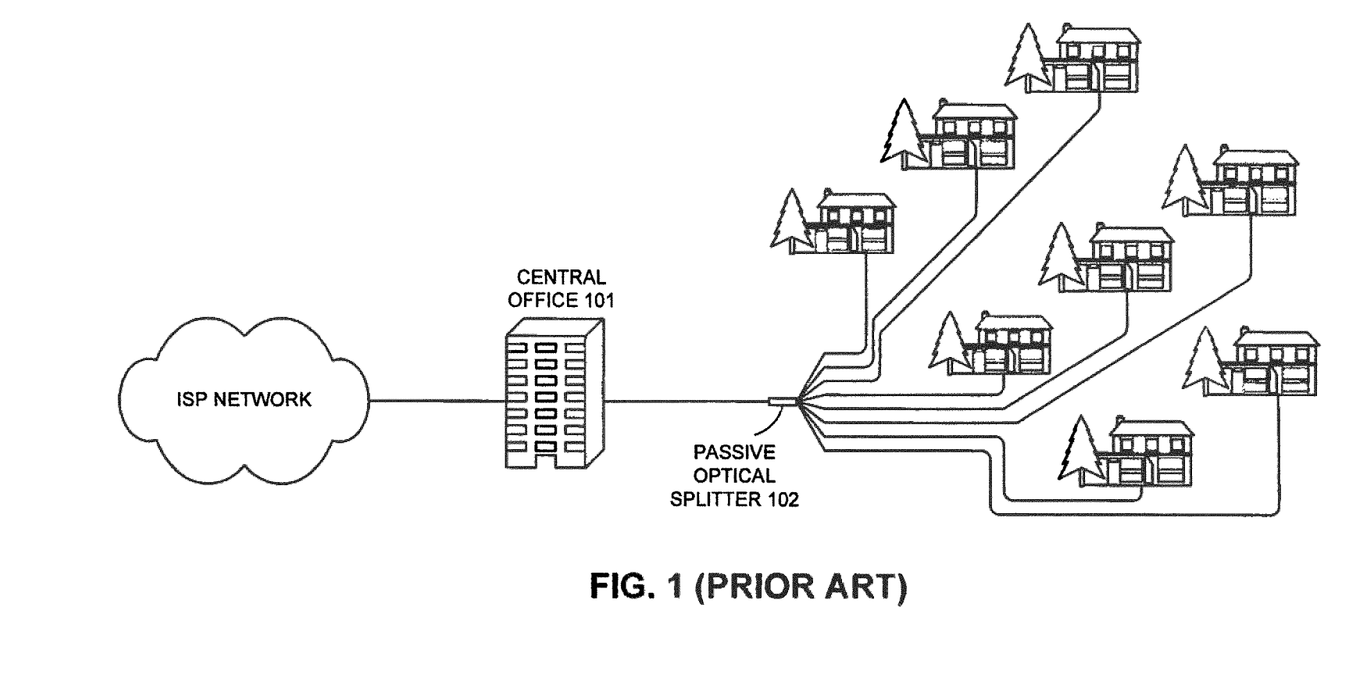
FIG. 1 illustrates an Ethernet passive optical network wherein a central office and a number of subscribers are coupled through optical fibers and an Ethernet passive optical splitter (prior art).

FIG. 1 illustrates a passive optical network, wherein a central office and a number of subscribers are coupled together through optical fibers and a passive optical splitter (prior art). As shown in FIG. 1, a number of subscribers are coupled to a central office 101 through optical fibers and a passive optical splitter 102. Passive optical splitter 102 can be placed in the vicinity of end-user locations, so that the initial fiber deployment cost is minimized. Central office 101 can be coupled to an external network 103, such as a metropolitan area network operated by an Internet service provider (ISP). Note that although FIG. 1 illustrates a tree topology, a PON can also be based on other topologies, such as a ring or a bus.

Normal Operation Mode in EPON

FIG. 2 illustrates an EPON in normal operation mode (prior art). To allow ONUs to join an EPON at arbitrary times, an EPON typically has two modes of operation: a normal operation mode and a discovery (initialization) mode. Normal operation mode accommodates regular upstream data transmissions, where an OLT assigns transmission opportunities to all initialized ONUs.

As shown in FIG. 2, in the downstream direction, OLT 201 broadcasts downstream data to ONU 1 (211), ONU 2 (212), and ONU 3 (213). While all ONUs may receive the same copy of downstream data, each ONU selectively forwards only the data destined to itself to its corresponding users, which are user 1 (221), user 2 (222), and user 3 (223), respectively.

In the upstream direction, OLT 201 first schedules and assigns transmission timeslots to each ONU according to the ONU's service-level agreement. When not in its transmission timeslot, an ONU typically buffers the data received from its user. When its scheduled transmission timeslot arrives, an ONU transmits the buffered user data within the assigned transmission window.

Since every ONU takes turns in transmitting upstream data according to the OLT's scheduling, the upstream link's capacity can be efficiently utilized. However, for the scheduling to work properly, the OLT needs to discover and initialize a newly joined ONU. During discovery, the OLT may collect information critical to transmission scheduling, such as the ONU's round-trip time (RTT), its media access control (MAC) address, its service-level agreement, etc. (Note that in some cases service-level agreement may already be known to the OLT.)

Generating Frequency for Upstream Transmission

Figure 3A:
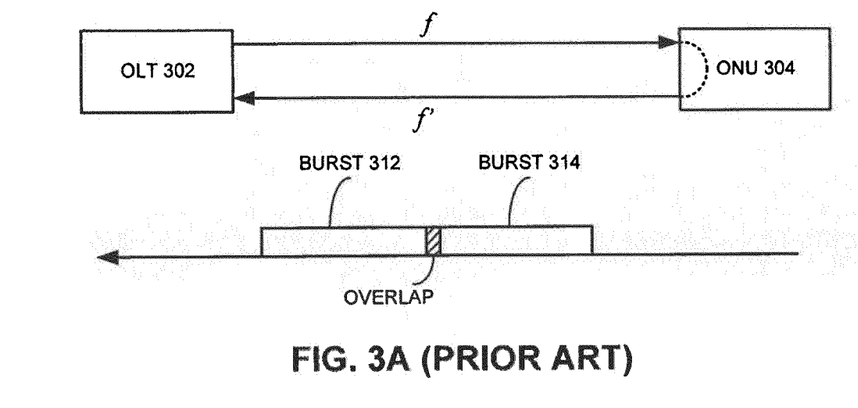
FIG. 3A illustrates an ONU generating a loop-back clock frequency based on an OLT's downstream clock frequency and a possible overlapping between two upstream bursts caused by excessive clock-frequency drifting (prior art).

It is of critical importance that an ONU uses substantially the same clock frequency for upstream transmission as the clock frequency used by the OLT, so that an upstream transmission window can properly accommodate a data burst. FIG. 3A illustrates an ONU generating a loop-back clock frequency based on an OLT's downstream clock frequency (prior art). As is shown in FIG. 3A, according to the IEEE 802.3ah standards, an ONU 304 can derive its transmission clock frequency, f, based on a loop-back clock frequency f' used by an OLT 302 for downstream transmission. The loop-back clock is typically generated by a phase-locking loop (PLL), which is designed to reduce jitter and track the frequency of the imperfect recovered clock from the receiver. The loop-back clock frequency f', however, is still subject to jitter and drifting introduced by the derivation circuit. Such jitter and drifting may impair of the quality of upstream transmission.

In particular, excessive frequency jitter or drifting can cause errors in upstream transmission. As is shown in FIG. 3A, when an upstream burst 312 is transmitted with a slower clock frequency, the time required to finish the transmission may be greater than the duration of the allocated transmission window. Consequently, the tail of burst 312 may overlap with a subsequent burst 314, causing transmission error for both bursts. Hence, it is necessary to ensure that a transmitted burst remains within the allocated transmission window.

Figure 3B:
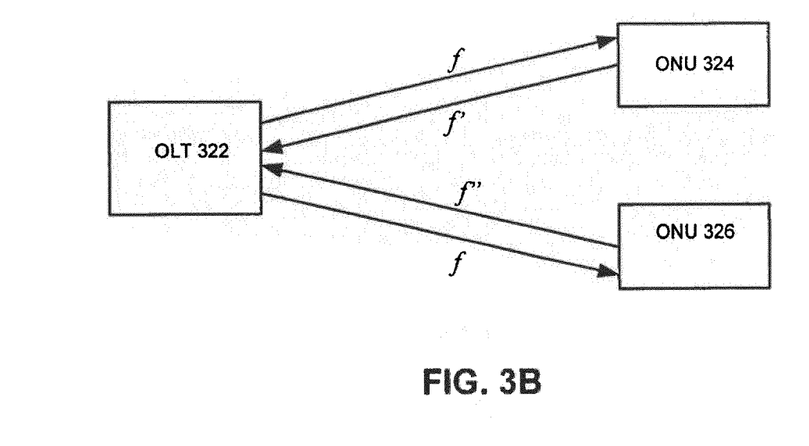
FIG. 3B illustrates two ONUs equipped with locally generated clock frequencies in accordance with an embodiment of the present invention.

To prevent the aforementioned problem, one embodiment of the present invention uses a separately generated clock frequency at each ONU. This clock frequency may be generated, for example, with a local oscillator and ideally is substantially the same as the clock frequency used by the OLT. A local oscillator is preferred due to its lower jitter output. Reduced jitter decreases the bit error rate and improves the quality of the upstream transmission. FIG. 3B illustrates two ONUs equipped with locally generated clock frequencies in accordance with an embodiment of the present invention. As is shown in FIG. 3B, an OLT 322 transmits downstream data to ONUs 324 and 326 with a clock frequency f. ONU 324 transmits its upstream data at its own clock frequency f'. Similarly, ONU 326 transmits upstream data at clock frequency f''.

Ideally, both f' and f'' are substantially the same as f. It is difficult, however, to ensure that both f' and f'' are exactly the same as f. To mitigate the effect of excessive frequency drift, one embodiment of the present invention allows modification of the number of bits included in a burst, so that the transmitted burst remains within the allocated transmission window.

Figure 4:
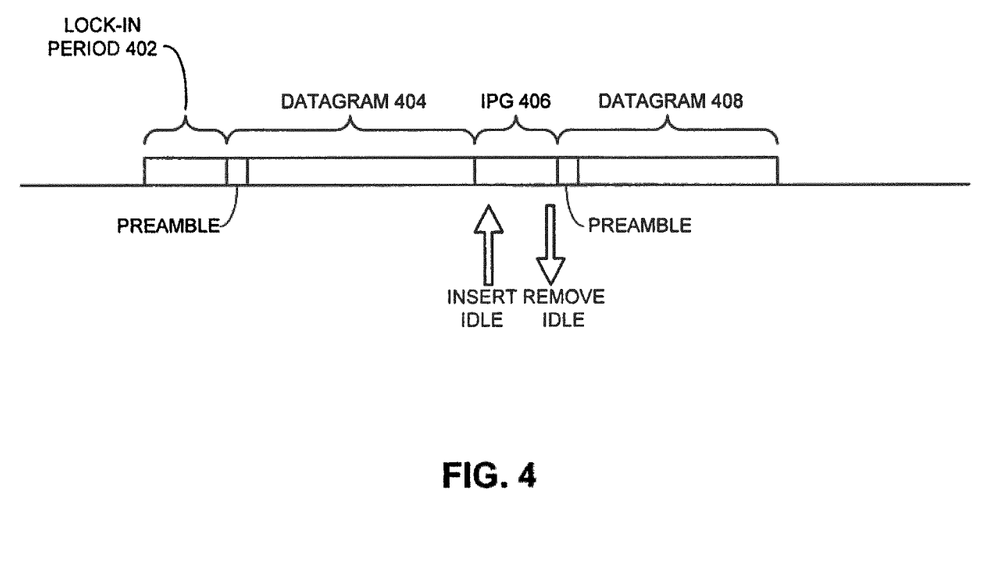
FIG. 4 illustrates the process of inserting an idle character into or removing an idle character from an inter-packet gap (IPG) within a data burst transmitted from an ONU in accordance with an embodiment of the present invention. The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

FIG. 4 illustrates the process of inserting an idle character into or removing an idle character from an inter-packet gap (IPG) within a data burst transmitted from an ONU in accordance with an embodiment of the present invention. As is shown in FIG. 4, a burst to be transmitted from an ONU typically comprises a lock-in period 402 (which is used by the OLT to perform bit-level synchronization with the received data burst), a number of datagrams or packets (such as datagrams 404 and 408), and inter-packet gaps (IPG) (such as IPG 406). Note that each datagram may include a preamble.

In one embodiment of the present invention, when the ONU's local clock slows down to the point that the total time required to transmit the burst is greater than a preferred value by, for example, one idle character, the ONU may remove one idle character from an IPG. In this way, the ONU can ensure that the actual transmission time of the burst remains substantially accurate with regard to the allocated transmission window.

Similarly, when the ONU's local clock speeds up to the point that the total time required to transmit the burst is less than a preferred value by, for example, one idle character, the ONU may insert one additional idle character into an IPG. Note that the ONU can calculate the preferred value of the transmission time based on the clock frequency used by the OLT for downstream transmission.

Another approach to compensate for the clock-frequency drift at an ONU is to compare the local clock frequency with that of the OLT and to request a transmission window accordingly to compensate for the frequency discrepancy. For example, if an ONU's local clock happens to have slowed down, and the ONU has n bits of data burst to transmit, the ONU may request a transmission window of if bits (n'>n) based on the OLT's clock frequency. Consequently; the ONU can successfully transmit the n-bit burst within the allocated window, even with a slower clock.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for accommodating different clock frequencies in an Ethernet passive optical network (EPON), the EPON including an optical line terminal (OLT) and an optical network unit (ONU), comprising:
   comparing, by the ONU, an ONU clock and an OLT clock to determine whether the ONU clock is faster than the OLT clock;
   determining, by the ONU, a first upstream transmission window in terms of an amount of data to be included in an upstream data burst that is to be transmitted if the OLT clock were to be used for transmission of the upstream data burst during the first upstream transmission window;
   requesting, by the ONU, a second upstream transmission window, the second upstream transmission window being smaller than the first upstream transmission window when the ONU clock is faster than the OLT clock; and
   transmitting by the ONU, the upstream data burst to the OLT during the second upstream transmission window, the upstream data burst including the amount of data used in determining the first upstream transmission window.

2. The method of claim 1, further comprising:
   receiving a signal from the OLT; and
   deriving the OLT clock from the signal.

3. The method of claim 1, wherein the comparing comprises:
   comparing the ONU clock and the OLT clock to determine a difference between the ONU clock and the OLT clock.

4. The method of claim 1, wherein the comparing further comprises:
   comparing the ONU clock and the OLT clock to determine whether the ONU clock is slower than the OLT clock; and
   requesting a third upstream transmission window, the third upstream transmission window being larger than the first upstream transmission window when the ONU clock is slower than the OLT clock.

5. The method of claim 4, wherein the upstream data burst is characterized as including a first number of bits, and wherein the requesting the third upstream transmission window comprises:
   requesting the third upstream transmission window in terms of a time needed to transmit a second number of bits when the ONU clock is slower than the OLT clock, the second number of bits being greater than the first number of bits.

6. The method of claim 1, wherein the upstream data burst is characterized as including a first number of bits, and wherein the requesting the second upstream transmission window comprises:
   requesting the second upstream transmission window in terms of a time needed to transmit a second number of bits when the ONU clock is faster than the OLT clock, the second number of bits being less than the first number of bits.

7. The method of claim 4, further comprising:
   determining a size of the third upstream transmission window in terms of an amount of data that is to be transmitted based on the OLT clock.

8. The method of claim 1, wherein the determining the second upstream transmission window further comprises:
   determining a size of the second upstream transmission window in terms of an amount of data that is to be transmitted based on the OLT clock.

9. An Ethernet passive optical network (EPON) for accommodating for different clock frequencies, comprising:
   an optical network unit (ONU), coupled to an optical line terminal (OLT), configured to:
   compare an ONU clock and an OLT clock to determine whether the ONU clock is faster than the OLT clock;
   determine a first upstream transmission window in terms of an amount of data to be included in an upstream data burst that is to be transmitted if the OLT clock were to be used for transmission of the upstream data burst during the first upstream transmission window;
   request a second upstream transmission window, the second upstream transmission window being, smaller than the first upstream transmission window when the ONU clock is faster than the OLT clock; and
   transmit the upstream data burst to the OLT during the second upstream transmission window, the upstream data burst including the amount of data used in determining the first upstream transmission window.

10. The EPON of claim 9, wherein the ONU is farther configured to compare the ONU clock and the OLT clock to determine a difference between the OLT clock and the ONU clock.

11. The EPON of claim 9, wherein the ONU is further configured to compare the ONU clock and the OLT clock to determine whether the ONU clock is slower than the OLT clock, and to request a third upstream transmission window, the third upstream transmission window being larger than the first upstream transmission window when the ONU clock is slower than the OLT clock.

12. The EPON of claim 11, wherein the ONU is further configured to determine a size of the third upstream transmission window in terms of an amount of data that is to be transmitted based on the OLT clock.

13. The EPON of claim 11, wherein the ONU is further configured to transmit the upstream data burst during the third upstream transmission window.

14. The EPON of claim 9, wherein the upstream data burst is characterized as including a first number of bits, and wherein the ONU is further configured to request the first upstream transmission window in terms of a time needed to transmit a second number of bits when the ONU clock is slower than the OLT clock, the second number of bits being greater than the first number of bits.

15. The EPON of claim 9, wherein the upstream data burst is characterized as including a first number of bits, and wherein the ONU is further configured to request the first upstream transmission window in terms of a time needed to transmit a second number of bits when the ONU clock is faster than the OLT clock, the second number of bits being less than the first number of bits.

16. The EPON of claim 9, wherein the ONU is further configured to determine a size of the second upstream transmission window in terms of an amount of data that is to be transmitted based on the OLT clock.

17. The EPON of claim 9, wherein the ONU is further configured to transmit the upstream data burst during the second upstream transmission window.

18. A passive optical network (PON) for accommodating for different clock frequencies, comprising:
  an optical network unit (ONU), coupled to an optical line terminal (OLT), configured to:
    compare an ONU clock and an OLT clock to determine whether the ONU clock is faster than the OLT clock;
    determine a first upstream transmission window in terms of an amount of data to be included in an upstream data burst that is to be transmitted if the OLT clock were to be used for transmission of the upstream data burst during the first upstream transmission window;
    request a second upstream transmission window, the second upstream transmission window being smaller than the first upstream transmission window when the ONU clock is faster than the OLT clock; and
    transmit the upstream data burst during the second upstream transmission window, the upstream data burst including the amount of data used in determining the first upstream transmission window.

19. The PON of claim 18, wherein the upstream data burst is characterized as including a first number of bits, and wherein the ONU is further configured to request the second upstream transmission window in terms of a time needed to transmit a second number of bits when the ONU clock is faster than the OLT clock, the second number of bits being less than the first number of bits.

20. The PON of claim 18, wherein the ONU is further configured to compare the ONU clock and the OLT clock to determine whether the ONU clock is slower than the OLT clock, and to request a third upstream transmission window larger than the first upstream transmission window when the ONU clock is slower than the OLT clock.

* * * * *

UNITED STATES PATENT AND TRADEMARK OFFICE
CERTIFICATE OF CORRECTION

PATENT NO. : 8,588,257 B2  
APPLICATION NO. : 13/073525  
DATED : November 19, 2013  
INVENTOR(S) : Boyd et al.

It is certified that error appears in the above-identified patent and that said Letters Patent is hereby corrected as shown below:

In the Claims

Claim 10, Column 8, line 53, replace "farther" with --further--.

Claim 18, Column 10, line 11, replace "taster" with --faster--.

Signed and Sealed this  
Twenty-fourth Day of June, 2014

Michelle K. Lee  
*Deputy Director of the United States Patent and Trademark Office*